United States Patent Office 3,176,048
Patented Mar. 30, 1965

3,176,048
ISOMERISATION OF HYDROCARBONS
Alan Arthur Yeo and James Keith Hambling, Sunbury-on-Thames, England, assignors to The British Petroleum Company Limited, London, England, a joint-stock corporation of Great Britain
No Drawing. Filed May 24, 1961, Ser. No. 112,218
Claims priority, application Great Britain, May 30, 1960, 19,213/60
3 Claims. (Cl. 260—683.2)

This invention relates to the isomerisation of hydrocarbons.

According to this invention a hydrocarbon is passed, under isomerising conditions, in contact with a lamellar complex containing or consisting of an alkali metal and carbon.

Suitably the hydrocarbon is a mono-olefin which, in accordance with the invention, undergoes isomerisation by migration of the double bond and/or migration of an alkyl group.

According to one aspect of the invention isomerisation of a hexene or mixture of hexenes (not being of the equilibrium composition at the reaction conditions) is effected by passing the hexene or a mixture of hexenes in contact with a lamellar complex containing or consisting of an alkali metal and carbon.

Preferably the hexene is a propylene dimer.

Preferably the lamellar complex contains potassium. Preferred lamellar complexes have the formulae $KC_8$, $KC_{16}$, $KC_{24}$, $KC_{36}$, $KC_{48}$ and $KC_{60}$ or mixtures thereof, but if desired homologous compounds of higher carbon to potassium ratio may be employed. Other lamellar complexes which may be employed contain lithium, sodium, rubidium, and caesium. A suitable sodium complex has the formula $NaC_{64}$. If desired, mixtures of these complexes may be used. The production of these complexes is described by W. Rudoff and E. Schulze in Zeitung Anorg. u. allgem. Chem., col. 277, at page 156 et seq. (1954).

The production of other lamellar complexes is described by R. C. Asher and S. A. Wilson in Nature, 1958, vol. 181, at page 409 et seq., and by R. C. Asher in J. Inorg. Nucl. Chem., 1959, vol. 10, at page 238 et seq.

Usually a pre-formed complex of the type hereinbefore described will be brought into contact with the hydrocarbon; this is not essential if the isomerisation conditions are such that the complex will form in situ and in this case a mixture of alkali metal and carbon may be contacted with the hydrocarbon.

The catalyst may consist wholly of the lamellar complex or may consist of or contain a mixture of the lamellar complex with an alkali metal supported on carbon, said mixture containing the lamellar complex in any proportion. The proportion of the catalyst existing as lamellar complex will be determined, at least in part, by the nature of the carbon employed and by the relative proportions of alkali metal and carbon. Furthermore, if desired, the catalyst may contain free carbon. If desired, the catalyst may contain free alkali metal.

The carbon used in forming the lamellar complex will preferably be wholly or partly in the form of natural or synthetic graphite. However, other forms of carbon may be employed providing that they are capable of reacting with an alkali metal to form a lamellar complex. Thus there may be employed forms of carbon which contain graphite in microcrystalline form together with carbon of a nature which does not form lamellar complexes with alkali metals.

The carbon employed may contain trace impurities in the form of metal compounds.

Metals derived from trace impurities, for example iron, silicon and aluminium, may form an association with these lamellar structures, and may exert a modifying effect upon the reactions according to this invention.

Usually elevated temperatures, preferably in the range 50 to 400° C. will be employed for effecting the isomerisation.

The preferred reaction temperature will lie in the range 50–200° C. Above 200° C. polymers may be formed.

Usually the reaction pressure will be superatmospheric, preferably being in the range 50 to 4000 lbs./sq. in. gauge. The combination of isomerisation conditions employed will be selected according to the reactivity of the olefin and the nature of the product required.

The process of the present invention is particularly valuable for the production of 2-methylpentene-2.

According to one aspect of the invention there is provided a process which comprises isomerising 4-methylpentene-1 in contact with a complex of the formula $KC_x$, where $x$ is 24, 36, 48 or 60, or mixtures thereof, and recovering from the product a $C_6$ fraction consisting of or containing 2-methyl-pentene-2.

In general, high yields of 2-methylpentene-2 will be obtained when the value of $x$ is high. Variations in yield at a given value of $x$ are to be expected when using $KC_x$ compounds derived from different sources of carbon. These variations probably arise from variations in the amounts of trace impurities which, it is believed, exert a modifying action on the course of the reaction. In general $KC_x$ compounds derived from carbon of high ash content favour high yields of 2-methylpentene-2.

Preferably the $KC_x$ compounds contains a small amount of iron, and/or aluminium usually in the form of oxide. These elements are usually present in commercially available carbon and thus will usually be present in $KC_x$ compounds derived therefrom. However, if desired, small amounts of reaction modifying elements for example iron and/or aluminium and/or sodium, in elemental or combined form, may be added ot the $KC_x$ compound or to the carbon used in its formation.

When using $KC_{24}$ it is necessary to use $KC_{24}$ derived from carbon having a high content of trace elements since in their absence the reaction towards 2-methylpentene-2 is slow.

The invention is illustrated but not limited with reference to the following examples.

EXAMPLE 1

A lamellar complex was prepared from potassium and graphite, the graphite having an ash content of 8.2% by wt. On analysis the ash was found to contain the following metals (percent by wt.) present as oxides:

| | |
|---|---|
| Fe | 6.86 |
| Al | 14.1 |
| Si | 29.5 |
| Ca | 2.4 |

6.5 grams of potassium were mixed with 72 grams of the graphite and heated at 275° C. for 1 hour in an atmosphere of nitrogen. The catalyst thus obtained had the formula $KC_{36}$. After cooling in nitrogen 75 grams (0.16 mole) of the solid was transferred, under a nitrogen blanket, to a 1 litre stainless steel autoclave.

50 grams of a mixture of hexenes having the isomer distribution shown in Table 1 was introduced into the autoclave and shaken with the catalyst at 160° C. for 20 hours.

The hexenes were then distilled from the vessel and analysed by gas-chromatographic techniques. The analytical results are given below in Table 1.

*Table 1*

| Isomer distribution of hexene feed (percent wt.) | Isomer | Isomer distribution of product |
|---|---|---|
| 71.0 | 4-methylpentene-1 | 1.2 |
| 16.3 | 4-methylpentene-2 | 15.1 |
| 1.5 | 2-methylpentene-2 | 60.7 |
| 1.5 | 2-methylpentene-1 | 17.0 |
| 9.7 | n-hexenes | 6.0 |

EXAMPLE 2

The process of Example 1 was repeated with the following modifications:

(a) The catalyst was formed by mixing 6.5 grams of potassium with 120 grams of the same graphite, whereby a catalyst of formula $KC_{60}$ was formed.

(b) Reaction temperature in the autoclave was 150° C.

(c) The feedstock had the composition shown in Table 2.

The analysis of feedstock and product showed the following isomer distribution:

*Table 2*

| Isomer | Weight percent | |
|---|---|---|
| | Feed | Product |
| 4-Methylpentene-1 | 84.0 | 1.6 |
| 4-Methylpentene-2 | 6.7 | 13.3 |
| 2-Menthylpentene-1 | 8.1 | 19.7 |
| 2-Methylpentene-2 | trace | 65.6 |

EXAMPLE 3

The process of Example 1 was repeated with the following modifications:

(a) The catalyst was formed by mixing 6.5 grams of potassium with 120 grams of a different graphite, having an ash content of 4.40% by wt. in which silica and alumina predominated. The catalyst had the formula $KC_{60}$.

(b) The reaction temperature in the autoclave was 150° C.

(c) The feedstock had the composition A shown in Table 3. The run was repeated with feedstock of composition B.

The analysis of feedstocks and products showed the following isomer distributions.

*Table 3*

| Isomer | Weight percent | |
|---|---|---|
| | Feed | Product |
| A. | | |
| 4-Methylpentene-1 | 84.0 | 1.6 |
| 4-Methylpentene-2 | 6.7 | 13.4 |
| 2-Methylpentene-1 | 8.1 | 18.2 |
| 2-Methylpentene-2 | trace | 66.8 |
| B. | | |
| 4-Methylpentene-1 | trace | 1.4 |
| 4-Methylpentene-2 | 4.1 | 13.5 |
| 2-Methylpentene-1 | 85.4 | 18.3 |
| 2-Methylpentene-2 | 10.2 | 65.2 |

EXAMPLE 4

The proces of Example 1 was repeated with the following modifications:

(a) The catalyst was formed by mixing 6.5 grams of potassium with 120 grams of a different graphite, having an ash content of 0.15% by wt. The catalyst had the formula $KC_{60}$.

(b) The reaction temperature in the autoclave was 150° C.

(c) The feedstock had the composition A shown in Table 4. The run was repeated with feedstock of composition B.

The analysis of feedstocks and products showed the following isomer distributions:

*Table 4*

| Isomer | Weight percent | |
|---|---|---|
| | Feed | Product |
| A. | | |
| 4-Methylpentene-1 | 84.0 | 36.9 |
| 4-Methylpentene-2 | 6.7 | 27.1 |
| 2-Methylpentene-1 | 8.1 | 9.0 |
| 2-Methylpentene-2 | trace | 27.0 |
| B. | | |
| 4-Methylpentene-1 | trace | trace |
| 4-Methylpentene-2 | 4.1 | 13.2 |
| 2-Methylpentene-1 | 85.4 | 20.7 |
| 2-Methylpentene-2 | 10.4 | 65.3 |

It will be apparent that under the reaction conditions employed, the conversion of 4-methylpentene-1 in the presence of the lamellar complex derived from low ash graphite was lower than was the case when a high ash graphite was employed. Conversion of 2-methylpentene-1 was high even when using low ash graphite.

We claim:

1. A process which comprises isomerising 4-methylpentene-1 in contact with a catalyst consisting of a lamellar complex of potassium and graphite selected from the group of said lamellar complex catalysts consisting of $KC_{24}$, $KC_{36}$, $KC_{48}$, $KC_{60}$, and mixtures of the foregoing, and recovering from the product a $C_6$ fraction, the major constituent of which is 2-methylpentene-2.

2. A process as specified in claim 1, in which the graphite used in the production of the lamellar complex is of high ash content.

3. A process which comprises isomerising 2-methylpentene-1 in contact with a catalsyt consisting of a lamellar complex of potassium and graphite selected from the group of said lamellar complex catalysts consisting of $KC_{24}$, $KC_{36}$, $KC_{48}$, $KC_{60}$, and mixtures of the foregoing, at a temperature between 50 and 200° C., and recovering from the product a $C_6$ fraction, the major constituent of which is 2-methylpentene-2.

References Cited by the Examiner

UNITED STATES PATENTS

| | | | |
|---|---|---|---|
| 2,881,234 | 4/59 | Esmay et al. | 260—683.15 |
| 2,952,719 | 9/60 | Appell | 260—683.2 |
| 2,965,624 | 12/60 | Anderson | 260—94.2 |
| 3,084,206 | 4/63 | Yeo et al. | 260—683.15 |

FOREIGN PATENTS 842,136  7/60  Great Britain.

OTHER REFERENCES

Mellor: "Comprehensive Treatise on Inorganic and Theoretical Chemistry," published by John Wiley & Sons, Inc., New York, 1963, volume II, Supplement III, pages 1566–1567.

Moeler: "Inorganic Chemistry," John Wiley & Sons, Inc., New York, 1952, page 668 relied on.

ALPHONSO D. SULLIVAN, *Primary Examiner.*